Figure 1:
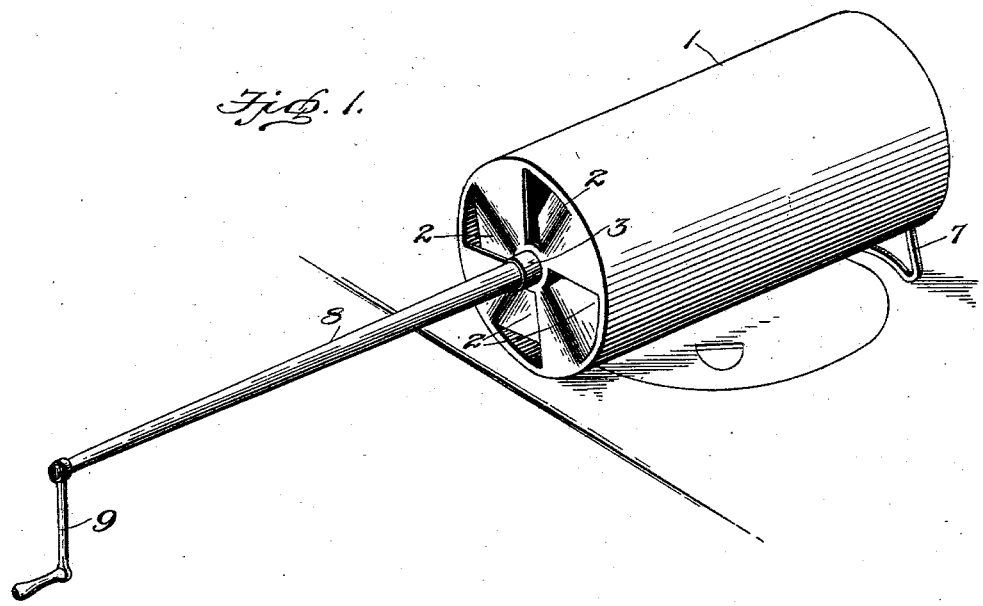

No. 633,791. Patented Sept. 26, 1899.
N. R. H. BURNETT.
PEANUT ROASTER.
(Application filed May 25, 1899.)

(No Model.)

Witnesses
C. E. Hunt
C. A. Ennis

Inventor
Nelson R. H. Burnett
by Wm. H. Ennis,
Attorney

UNITED STATES PATENT OFFICE.

NELSON R. H. BURNETT, OF CLAY BROOK, TENNESSEE.

PEANUT-ROASTER.

SPECIFICATION forming part of Letters Patent No. 633,791, dated September 26, 1899.

Application filed May 25, 1899. Serial No. 718,250. (No model.)

*To all whom it may concern:*

Be it known that I, NELSON R. H. BURNETT, a citizen of the United States, residing at Clay Brook, in the county of Madison and State of Tennessee, have invented certain new and useful Improvements in Peanut-Roasters; and I do declare the following to be a full, clear, and exact description of the invention, such as will enable others skilled in the art to which it appertains to make and use the same.

My invention relates to improvements in peanut-roasters; and the objects are to simplify and improve the construction, reduce the cost, and provide a convenient, efficient, and durable device of this character.

To these ends the invention consists in the construction, combination, and arrangement of the several parts of the device, as will be hereinafter more fully described, and particularly pointed out in the claim.

In the accompanying drawings the same reference characters indicate the same parts of the invention.

Figure 2:
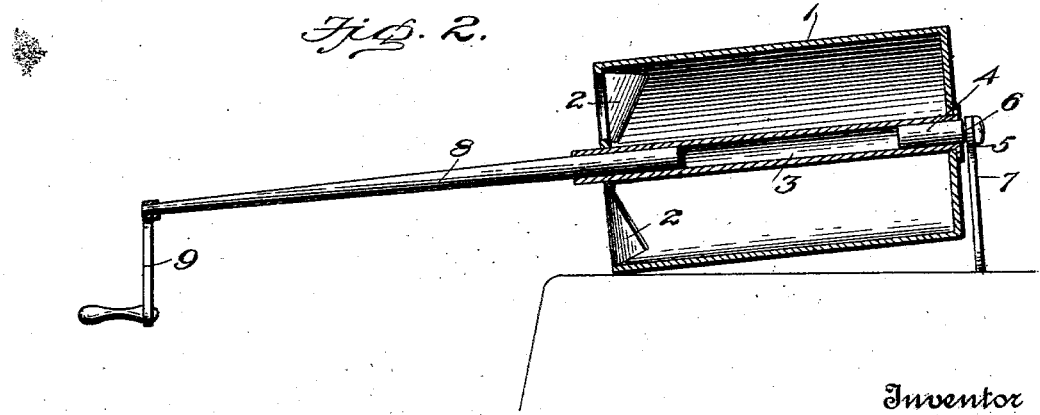

Figure 1 is a perspective view of my improved peanut-roaster. Fig. 2 is a longitudinal section of the same.

1 denotes a cylindrical shell closed at its rear end and having its front end formed with a concentric series of radiating and inwardly-projecting segmental blades 2 2.

3 denotes an axial tube or sleeve fixed in the front and rear ends of the shell, and 4 denotes a stud-shaft removably fixed in the rear end of the sleeve and formed with a circumferential groove 5 on its projecting end to receive the eye 6 of the supporting-bracket 7, the spread outer end of which extends radially a short distance beyond the periphery of the shell and which forms a support for that end of the shell when lying horizontally on the top of a stove, range, or similar source of heat. The projecting forward end of the sleeve or tube 3 forms a socket for the removable shaft 8, which is preferably made of wood or some other suitable non-conductor of heat, and its outer end terminates in a crank-handle 9, by means of which the shell 1 is rotated.

In operation the shell is set up on end and the peanuts placed inside through the openings in the front end formed by stamping or punching the wings and bending them inwardly, as shown. The shell is now placed horizontally on the stove, being supported at its rear end by the bracket and by its front end resting on the stove. When it is desired to rotate the shell, its front end is raised from off the stove by placing one hand under the shaft 8 and turning the crank with the other hand in the direction of the inclination of the blades or wings. This thoroughly agitates the contents of the shell without allowing any of them to escape, and after the operation of rotation is complete the nuts may be readily ejected by reversing the rotation of the shell, the wings or blades now acting as ejector-guides to direct the nuts out of the shell.

The device will be found equally efficient for roasting coffee and other berries, as well as for a variety of household uses requiring a device of this character.

When the device is in use and is not being rotated, the wooden handle may be removed and replaced when rotating the shell.

Although the accompanying drawings show my invention in the best form now known to me, at the same time various changes may be made in the minor details without departing from the spirit of my invention as set forth in the claim.

Having thus fully described my invention, what I claim as new and useful, and desire to secure by Letters Patent of the United States, is—

The shell 1 formed with the closed rear end, and having its front end formed with inwardly-projecting radial blades, the axial tube fixed in said shell, the stud-shaft fixed in one end of said tube, the supporting-bracket loosely mounted on said stud-shaft, and the removable crank-shaft mounted in the opposite end of said sleeve, substantially as shown and described.

In testimony whereof I have hereunto set my hand in presence of two subscribing witnesses.

NELSON R. H. BURNETT.

Witnesses:
W. A. CALDWELL,
C. P. BLACK.